United States Patent [19]

Kawakami et al.

[11] Patent Number: 5,146,347
[45] Date of Patent: Sep. 8, 1992

[54] DISC PLAYER CONTROL SYSTEM FOR QUICKLY PLACING DISC PLAYER IN COMMAND READY STATE

[75] Inventors: Akira Kawakami; Shoichi Katagiri, both of Saitama, Japan

[73] Assignee: Pioneer Electronic Corporation, Tokyo, Japan

[21] Appl. No.: 478,031

[22] Filed: Feb. 9, 1990

Related U.S. Application Data

[63] Continuation of Ser. No. 178,944, Apr. 7, 1988, abandoned.

[30] Foreign Application Priority Data

May 29, 1987 [JP] Japan .................................. 62-137532

[51] Int. Cl.$^5$ .............................................. H04N 5/76
[52] U.S. Cl. ...................................... 358/342; 358/343
[58] Field of Search ................. 358/342; 360/69, 74.1, 360/75, 73.03, 78.04; 369/32, 50

[56] References Cited

U.S. PATENT DOCUMENTS

| | | | |
|---|---|---|---|
| 4,445,188 | 4/1984 | Barnett | 360/75 |
| 4,550,347 | 10/1985 | Nakamura | 369/50 |
| 4,635,145 | 1/1987 | Horie et al. | 360/75 |
| 4,679,181 | 7/1987 | Naito | 369/50 |
| 4,699,102 | 7/1987 | Wevers et al. | 360/105 |
| 4,700,243 | 10/1987 | Tsuyuguchi et al. | 360/75 |
| 4,717,968 | 1/1988 | Painton | 360/35.1 |
| 4,727,443 | 2/1988 | Miyake et al. | 360/75 |
| 4,737,867 | 4/1988 | Ishikawa | 360/75 |
| 4,761,692 | 8/1988 | Yoshida et al. | 369/50 |
| 4,782,406 | 11/1988 | Shoji et al. | 360/75 |

FOREIGN PATENT DOCUMENTS

| | | | |
|---|---|---|---|
| 0064657 | 5/1980 | Japan | 360/75 |
| 0045670 | 9/1981 | Japan | 360/75 |

OTHER PUBLICATIONS

60-70550, Iizuka, Japan Abstract, Apr. 22, 1985.

*Primary Examiner*—Donald McElheny, Jr.
*Attorney, Agent, or Firm*—Sughrue, Mion, Zinn Macpeak & Seas

[57] ABSTRACT

A control method and apparatus for operating a disc player for a composite disc having a first region containing digital audio signals and a second region containing digital audio signals and frequency modulated video signals recorded in multiplex form and for which the rotational speed for playing the second region is significantly greater than for the first region. When the power source of the player is turned ON, if the spindle motor is already rotating, such as will occur especially when the power source is turned OFF then immediately back ON when playing the second region, the spindle motor is stopped and then the information detecting point of the pickup of the player is moved to the innermost circumferential position of the first region to be ready to immediately read table of contents information or the like when a play start instruction is received.

8 Claims, 2 Drawing Sheets

DISC PLAYER CONTROL SYSTEM FOR QUICKLY PLACING DISC PLAYER IN COMMAND READY STATE

This is a continuation of application Ser. No. 07/178,944, filed Apr. 7, 1988 now abandoned.

BACKGROUND OF THE INVENTION

The present invention relates to a method an apparatus for controlling a disc player, and more particularly to a control method to be effected when the power source of the disc player is turned ON.

Recently a composite disc, as shown in FIG. 3, has been developed and marketed. A composite disc has a first inner circumferential region (hereinafter referred to as a CD region) in which is recorded, for example, PCM (pulse code modulated) audio information 1a and a second outer circumferential region 1b (hereinafter referred to as a video region) in which is recorded, in multiplex form, FM (frequency modulated) video signals and PCM audio signals.

The video signals contain a component of a frequency higher than the PCM signal. Hence, when the signals are recorded in the video region, it is necessary to increase the rotational speed of the disc above that employed in recording the CD region. As a result, the rotational speed of the disc must be increased during reproduction when switching reproduction from the video region to the CD region.

Further, on a composite disc, so-called TOC (Table of Contents) information concerning the program information of the CD region and video region is recorded in a lead-in area of the CD region. It is necessary to read the TOC information before starting the playing of the disc or commencing a search operation. As a result, the information detection point of the player must be moved to a standby position at the innermost circumferential position of the CD region in response to commands for playing or searching.

However, because the disc rotates at a very high circumferential speed during the playing of the video region, it takes a considerably long time before the rotating disc can be stopped and the information detecting point moved to the innermost circumferential position of the CD region to wait for an externally generated command.

SUMMARY OF THE INVENTION

The present invention has been accomplished in order to solve the problems mentioned above.

A specific object of the invention is to provide a control method for a disk player in which the time required for placing the player in such a state that it can execute an externally generated command is significantly reduced, even when the power source is turned OFF and then back ON again during the playing of the video region of the disc, which region requires a very high circumferential speed.

According to a feature of the control method of the invention, the spindle motor of a composite disc player is compulsorily stopped when the power source of the disc player is turned ON, then the information detecting point is placed at the innermost circumferential position of the CD region of the disc.

BRIEF DESCRIPTION OF THE DRAWINGS

FIG. 2 a flowchart showing steps of the control method of the present invention after the power source is turned ON.

DESCRIPTION OF THE PREFERRED EMBODIMENTS

A preferred embodiment of the present invention will be described with reference to the accompanying drawings.

Figure 1:
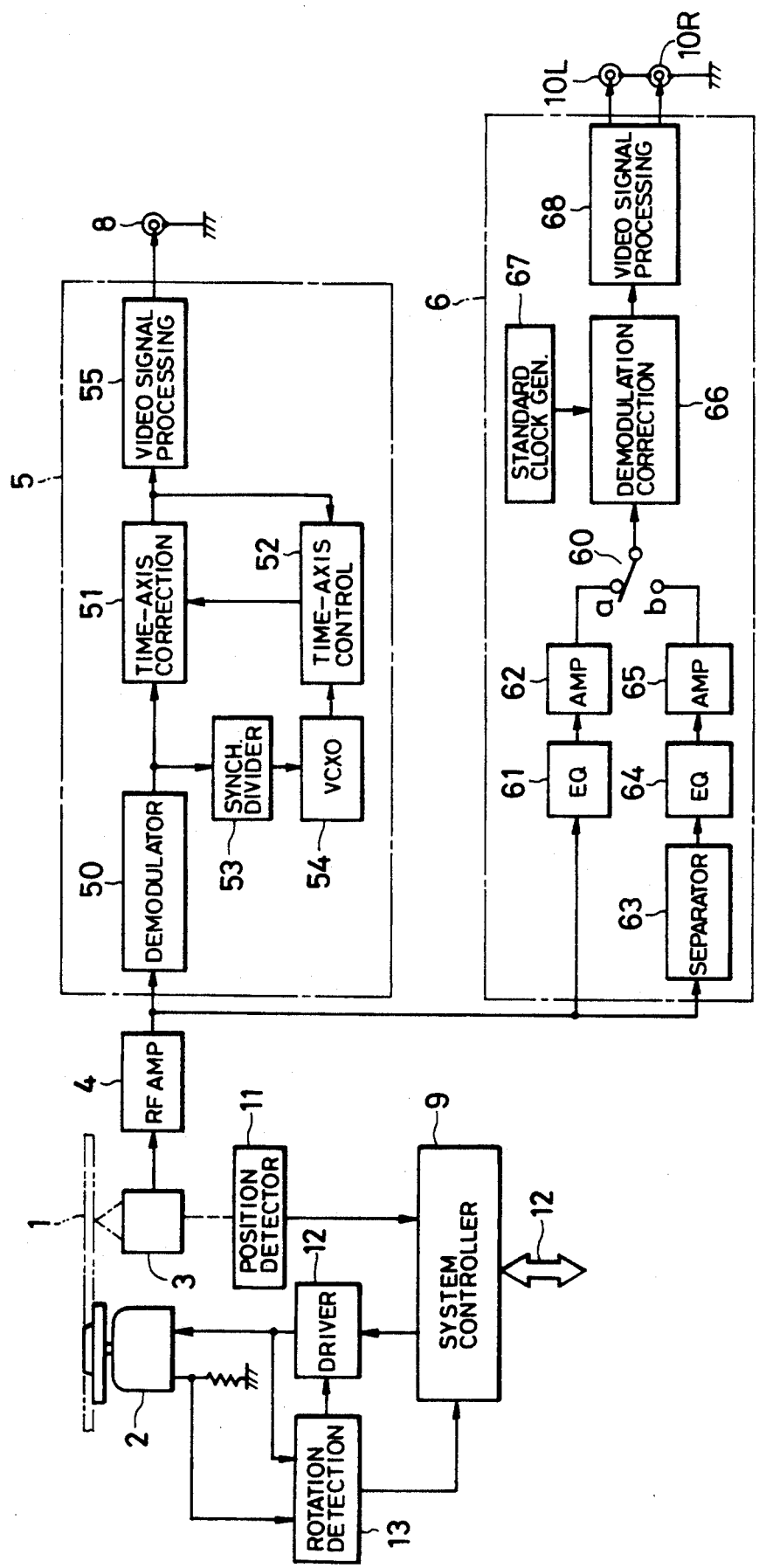
FIG. 1 is a block diagram showing a preferred embodiment of a disc player to which the control method of the present invention is applied.
Figure 3:
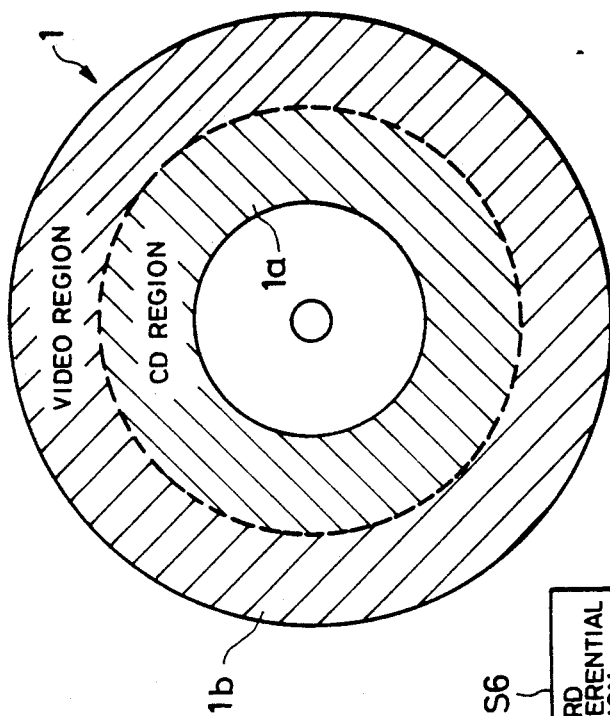
FIG. 3 shows the arrangement of recording regions on a composite disc.

FIG. 1 is a block diagram showing the construction of a disc player to which the control method according to the invention is applied. As shown in FIG. 1, the disc 1 is rotationally driven by a spindle motor 2, and the information recorded on the disc 1 is read through an optical pickup 3. The pickup 3 includes a laser diode for a light source, an optical system including an objective lens, a quadrant-type light detector, a focus actuator for controlling the direction of the light beam applied to the information-recorded surface of the disc 1 passing through the objective lens, and a tracking actuator for controlling the position of a main beam spot (information detecting point) on the recorded track in the radial direction of the disc. The output from the pickup is supplied to a video information demodulator system 5 and a digital information demodulation system 6 through an RF (high frequency) amplifier 4.

In the video information demodulation system 5, the RF signal from the RF amplifier 4 is demodulated to a video signal by the video demodulation circuit 50, and the resulting video signal is supplied to a time-axis correction circuit 51. The time-axis correction circuit 51, composed of, for example, a variable delay element such as a CCD, performs time-axis correction by changing the amount of delay imposed by the variable delay element according to a control signal from a time axis control circuit 52. The time-axis control circuit 52 produces oscillation outputs. The divided frequency output of a crystal oscillator (VCXO), oscillating in synchronization with a horizontal synchronizing signal separated from the video signal by a synchronization divider circuit 53, and a control signal, produced according to a phase difference between the horizontal synchronizing signal and a color burst signal in the video signal time-axis corrected by the time-axis correction circuit 51, is supplied to a video output terminal 8 through a video signal processing circuit 55. In the video signal processing circuit 55, various processing operations such as character inserting and video muting are carried out.

The digital information demodulation system 6, includes a changeover switch 60 for changing over the playing operation from the CD region to the video region. The switch 60 is set to a side a when the CD region is being played and to a side b when the video region is being played according to a changeover command produced by a system controller 9 (which will be described below). PCM audio signals recorded in the CD region and the video region, which are, for example, EFM (Eight-to-Fourteen Modulation) signals, and which are reproduced when the CD region is being played is supplied to a demodulation/correction circuit 66 through an equalizer circuit 61, and amplifier 62, and the changeover switch 60.

On the other hand, when the video region is being played, the reproduced EFM signal extracted from the reproduced RF signal through an EFM separator circuit 63 is supplied to the demodulation correction circuit 66 through an equalizer circuit 64, an amplifier 65, and the changeover switch 60.

The demodulation correction circuit 66 demodulates the EFM signal, and the demodulated EFM signal is stored in a memory (not shown) such as RAM. The input and output of data to the RAM is controlled according to a standard clock signal produced from a standard clock pulse generator 67 to perform data parity correction and deinterleaving. The digital audio signal demodulated and corrected in the demodulation correction circuit 66 is supplied to the audio output terminals 10L, 10R for left and right channels after being suitably further processed in an audio signal processing circuit 68 composed of a D/A (digital/analog) converter deglitcher, and etc.

A position detector 11 is provided near the path of the pickup 3 along the radial direction of the disc. The position detector 11 detects the position of the main beam produced by the pickup 3, which position is situated along the radial direction of the disc.

Figure 2:
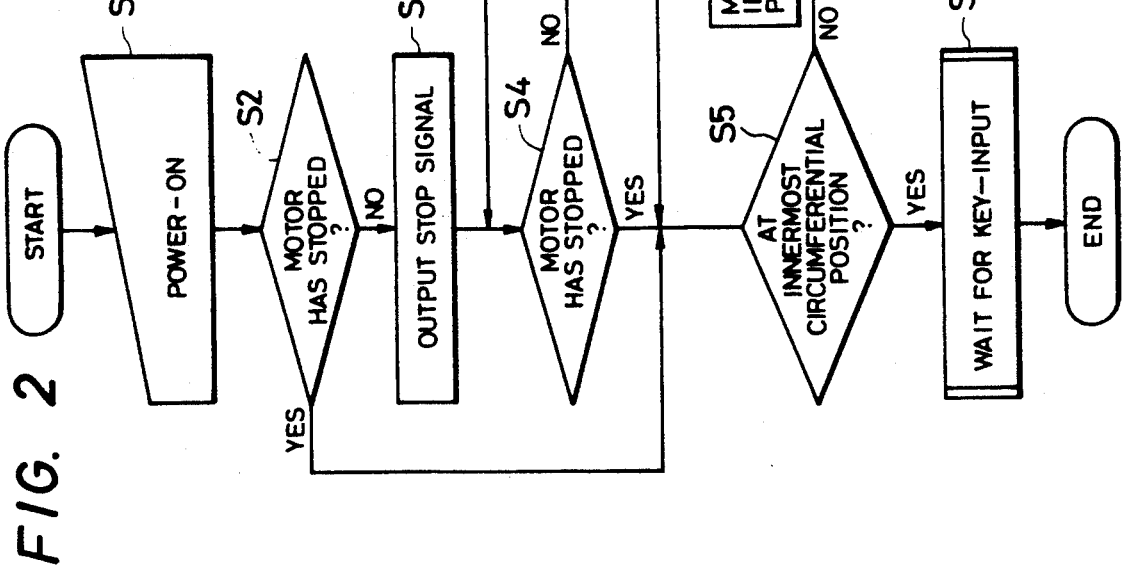

Information indicating the position detected by the position detector 11 is supplied to a system controller 9. The process of the control method of the present invention carried out such as when the power source is turned ON by a processor in the system controller 9, will be explained with reference to the flowchart of FIG. 2.

When the power source is turned ON (Step S1), the processor of the system controller 9 judges whether the spindle motor 2 has stopped or not in response to an output from the rotation ejection circuit 13 (Step S2). If the spindle motor 2 is rotating, the processor outputs a stop signal to the motor drive circuit 12 to compulsorily stop the spindle motor 2 (Step S3). Then the motor drive circuit 12 supplies a braking current to the spindle, the magnitude of which current is determined in proportion to the rate of rotation of the spindle motor 2 as indicated by a spindle motor speed signal supplied from the rotation detection circuit 13 to the motor drive circuit 12. Consequently, the spindle motor 2 is compulsorily stopped.

In Step S4, it is judged again whether the spindle motor 2 has stopped or not on the basis of the output from the rotation detection circuit 13. If the motor has stopped, it is determined whether the position of a main beam spot of the pickup 3 is at the innermost circumferential position of the CD region (Step S5). When the main beam spot is not at the innermost circumferential position of the CD region, the pickup 3 is moved toward the innermost circumferential position of the CD region (Step S6). When the main beam spot is at the innermost circumferential position of the CD region, the disc player is in such a state that it can accept and execute an externally supplied instruction for playing or searching (Step S7).

When an instruction for playing or searching is received after the disc player is in this state, rotation of the spindle motor 2 is started and the pickup 3 reads the TOC information recorded in the lead-in area of the CD region, after which an ordinary playing or searching operation can begin.

If in Step S2 it is determined that the spindle motor 2 has stopped when the power source is turned ON, the process jumps two steps to Step S5.

According to the present invention, as described above, it is judged whether the spindle motor 2 is rotating or not at the instant the power source is turned ON, and if the spindle motor 2 is rotating, it is compulsorily stopped, then the pickup 3 is moved to the innermost circumferential position of the disc to wait for an input instruction. Thus, it is possible to instantly stop the spindle motor 2 in order to condition the disc player to wait for an input instruction in a very short time, even if the power source is turned OFF during the playing of the disc and then immediately back ON. With the use of the present invention, the disc player can start a playing operation instantly after the power source is turned ON after being turned OFF.

Especially, when the power source is turned OFF during the playing of the video region of the disc and instantly returned to the ON condition, the use of the present invention is advantageous because the spindle motor 2 is rotated at a high speed when the disc player plays the video region of the disc.

As explained in detail above, according to the control method of the invention, the spindle motor of the composite disc player is compulsorily stopped if the motor is rotating at the instant of the disc player's power source is turned ON, and then the information detection point is placed at the innermost circumferential position of the CD region, resulting in a prompt setting of the disc player in the state where it can execute externally produced commands even if the power source is turned OFF and then quickly back ON during the playing in particular of the video region where the disc is rotated at a very high circumferential speed.

What is claimed is:

1. A control method for a disc player for playing a disc having a first region in which digital signals are recorded and a second region on which frequency modulated video signals and pulse code modulated audio signals are recorded, which method comprises the steps of:

compulsorily stopping a spindle motor for rotating said disc when said spindle motor is rotating and a power source of said disc player is turned from an OFF state to an ON state; and then moving an information detection point of a pickup to an innermost circumferential position of said first region when said information detection point is not at the innermost circumferential position of said first region.

2. The control method of claim 1, wherein said disc comprises a composite disc in which said first region contains pulse code modulated audio signals and said second region contains frequency modulated video signals and pulse code modulated audio signals recorded in multiplex form.

3. The control method of claim 1, wherein said innermost circumferential region contains table of contents information.

4. The control method of claim 1, wherein said compulsorily stopping step comprises the step of applying a braking signal to the spindle motor, the magnitude of the applied braking signal being proportional to a rate of rotation of the spindle motor.

5. A control apparatus for a disc player for playing a disc having a first region in which digital signals are recorded and a second region on which frequency modulated video signals and pulse code modulated audio signals are recorded, said control apparatus comprising:
- means for detecting a rotation of a spindle motor;
- means for compulsorily stopping said spindle motor for rotating said disc when said spindle motor is rotating and a power source of said disc player is turned from an OFF state to an ON state;
- means for detecting an information detecting point of a pickup; and
- means for moving said information detection point of a pickup to an innermost circumferential position of said first region when said information detection point is not at the innermost circumferential position of said first region.

6. The control apparatus of claim 5, wherein said disc is a composite disc and said first region contains pulse code modulated audio signals and said second region contains frequency modulated video signals and pulse code modulated audio signals recorded in multiplex form.

7. The control apparatus of claim 5, wherein said innermost circumferential region contains table of contents information.

8. The control apparatus of claim 5, wherein said compulsorily stopping means includes means for applying a braking signal to the spindle motor, the magnitude of the applied braking signal being proportional to a rate of rotation of the spindle motor.

* * * * *